(12) United States Patent
Minarcin et al.

(10) Patent No.: US 8,204,664 B2
(45) Date of Patent: Jun. 19, 2012

(54) METHOD FOR CONTROLLING REGENERATIVE BRAKING IN A VEHICLE

(75) Inventors: Monika A Minarcin, Northville, MI (US); Jon K. Logan, Howell, MI (US); Jian M Wang, Ann Arbor, MI (US); Eric M. Rask, Royal Oak, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 874 days.

(21) Appl. No.: 12/260,263

(22) Filed: Oct. 29, 2008

(65) Prior Publication Data

US 2009/0118888 A1   May 7, 2009

Related U.S. Application Data

(60) Provisional application No. 60/985,223, filed on Nov. 3, 2007.

(51) Int. Cl.
*G06F 7/70* (2006.01)
*G05D 1/00* (2006.01)
*B60K 6/20* (2007.10)

(52) U.S. Cl. .......................... 701/70; 701/84; 180/65.21

(58) Field of Classification Search .................. 701/22, 701/35, 208, 211, 213, 300, 25, 70, 84; 180/65.21, 180/65.1–65.8; 340/995.1, 995.19; 903/930
See application file for complete search history.

(56) References Cited

U.S. PATENT DOCUMENTS

| 6,278,916 | B1 * | 8/2001 | Crombez ....................... 701/22 |
| 6,832,148 | B1 | 12/2004 | Bennett |
| 6,868,318 | B1 | 3/2005 | Cawthorne |
| 7,154,236 | B1 | 12/2006 | Heap |
| 2002/0116099 | A1 | 8/2002 | Tabata et al. |
| 2005/0076958 | A1 | 4/2005 | Foster |
| 2005/0077867 | A1 | 4/2005 | Cawthorne |
| 2005/0077877 | A1 | 4/2005 | Cawthorne |
| 2005/0080523 | A1 | 4/2005 | Bennett |
| 2005/0080527 | A1 | 4/2005 | Tao |
| 2005/0080535 | A1 | 4/2005 | Steinmetz |
| 2005/0080537 | A1 | 4/2005 | Cawthorne |
| 2005/0080538 | A1 | 4/2005 | Hubbard |
| 2005/0080539 | A1 | 4/2005 | Hubbard |
| 2005/0080540 | A1 | 4/2005 | Steinmetz |
| 2005/0080541 | A1 | 4/2005 | Sah |
| 2005/0182526 | A1 | 8/2005 | Hubbard |
| 2005/0182543 | A1 | 8/2005 | Sah |
| 2005/0182546 | A1 | 8/2005 | Hsieh |

(Continued)

FOREIGN PATENT DOCUMENTS

EP   1306263 A2   5/2003

(Continued)

*Primary Examiner* — James Trammell
*Assistant Examiner* — Muhammad Shafi

(57) ABSTRACT

A vehicle includes a friction braking system and a powertrain system including a torque machine operative to react tractive torque input from a wheel of the vehicle. A method for controlling braking in a vehicle includes monitoring operation of the powertrain system, determining a driver intended total brake torque, determining a regenerative braking capacity based upon the operation of the powertrain system, determining a regenerative braking request based upon a time-rate change in the regenerative braking capacity, and determining a motor torque command for the torque machine based upon the regenerative braking request.

8 Claims, 4 Drawing Sheets

U.S. PATENT DOCUMENTS

| | | |
|---|---|---|
| 2005/0182547 A1 | 8/2005 | Sah |
| 2005/0189918 A1 | 9/2005 | Weisgerber |
| 2005/0200197 A1* | 9/2005 | Crombez et al. ............... 303/152 |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2006/0231304 A1* | 10/2006 | Severinsky et al. .......... 180/65.2 |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Aettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |
| 2009/0118925 A1 | 5/2009 | Hsieh |
| 2009/0118926 A1 | 5/2009 | Heap |
| 2009/0118927 A1 | 5/2009 | Heap |

| | | |
|---|---|---|
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

FOREIGN PATENT DOCUMENTS

| | | |
|---|---|---|
| GB | 2386879 * | 1/2003 |
| GB | 2386879 A | 10/2003 |
| WO | WO-2006080570 A1 | 8/2006 |

* cited by examiner

METHOD FOR CONTROLLING REGENERATIVE BRAKING IN A VEHICLE

CROSS REFERENCE TO RELATED APPLICATION

This application claims the benefit of U.S. Provisional Application No. 60/985,223 filed on Nov. 3, 2007 which is hereby incorporated herein by reference.

TECHNICAL FIELD

This disclosure is related to vehicle operation and regenerative braking control.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which uses an input member for receiving tractive torque from a prime mover power source, preferably an internal combustion engine, and an output member. The output member can be operatively connected to a driveline for a motor vehicle for transmitting tractive torque thereto. Torque machines, e.g., electric machines operative as motors or generators, generate a torque input to the transmission independently of a torque input from the internal combustion engine. The electric machines may transform vehicle kinetic energy transmitted through the vehicle driveline to electrical energy that is storable in an electrical energy storage device. A control system monitors various inputs from the vehicle and the operator and provides operational control of the powertrain, including controlling transmission operating range state and gear shifting, controlling the torque-generative devices, and regulating the electrical power interchange among the electrical energy storage device and the electric machines to manage outputs of the transmission, including torque and rotational speed.

SUMMARY

A vehicle includes a friction braking system and a powertrain system including a torque machine operative to react tractive torque input from a wheel of the vehicle. A method for controlling braking in a vehicle includes monitoring operation of the powertrain system, determining a driver intended total brake torque, determining a regenerative braking capacity based upon the operation of the powertrain system, determining a regenerative braking request based upon a time-rate change in the regenerative braking capacity, and determining a motor torque command for the torque machine based upon the regenerative braking request.

BRIEF DESCRIPTION OF THE DRAWINGS

One or more embodiments will now be described, by way of example, with reference to the accompanying drawings, in which.

DETAILED DESCRIPTION

Figure 1:
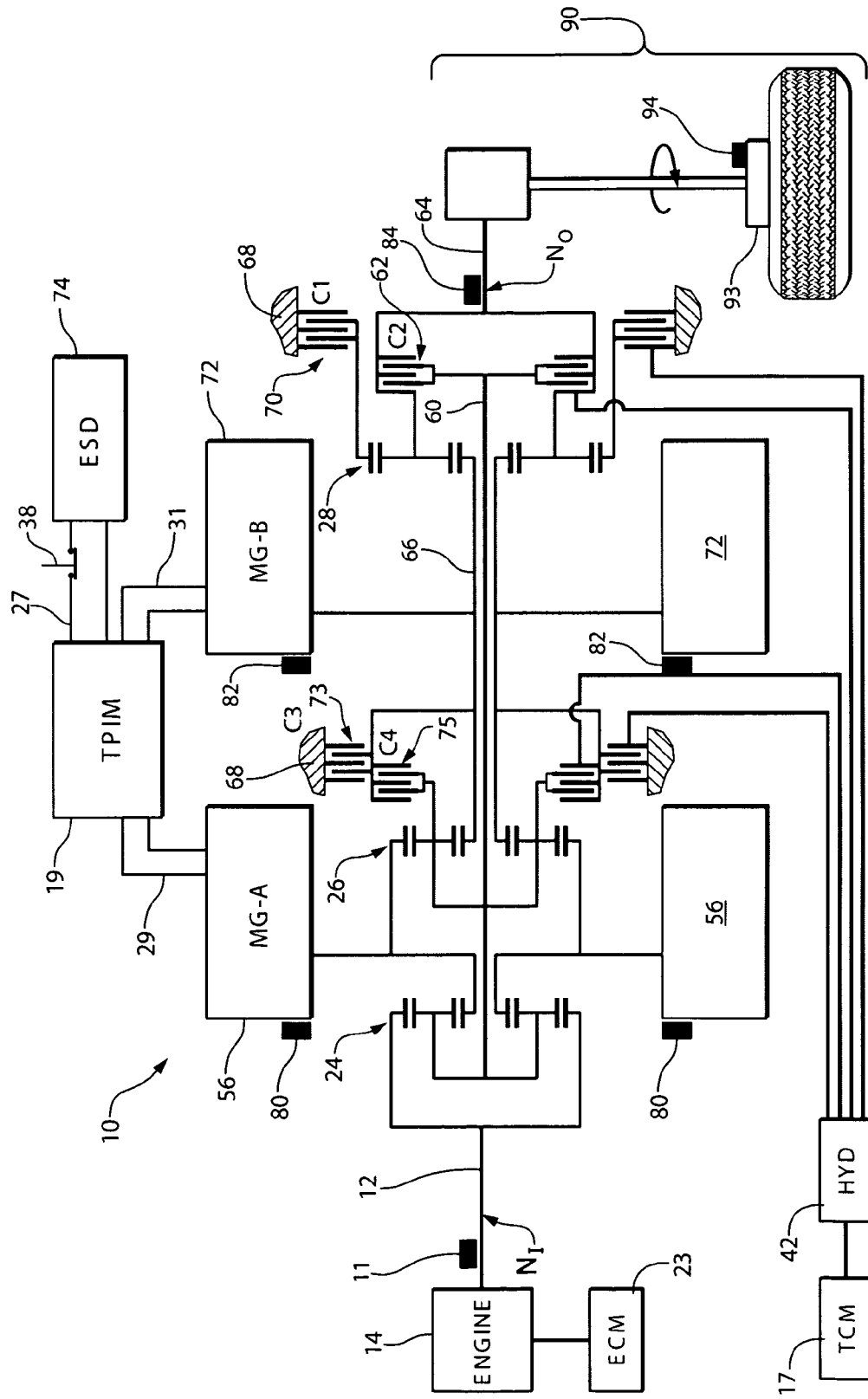
FIG. 1 is a schematic diagram of an exemplary powertrain, in accordance with the present disclosure.
Figure 2:
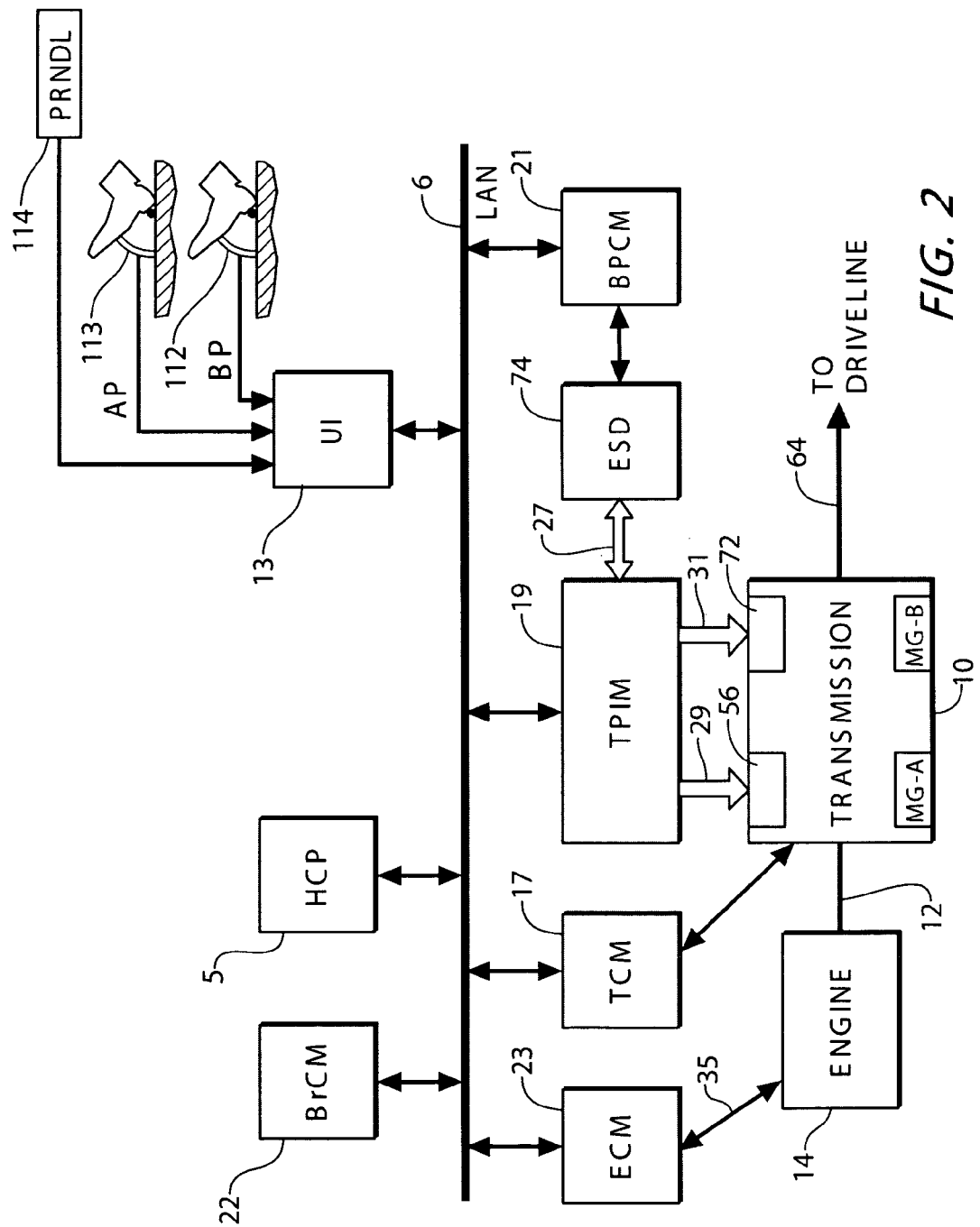
FIGS. 2 and 3 are schematic diagrams of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electromechanical hybrid transmission 10 operatively connected to an engine 14 and torque machines comprising first and second electric machines ('MG-A') 56 and ('MG-B') 72 in one embodiment. The engine 14 and first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol used is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to ground the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

Figure 3:
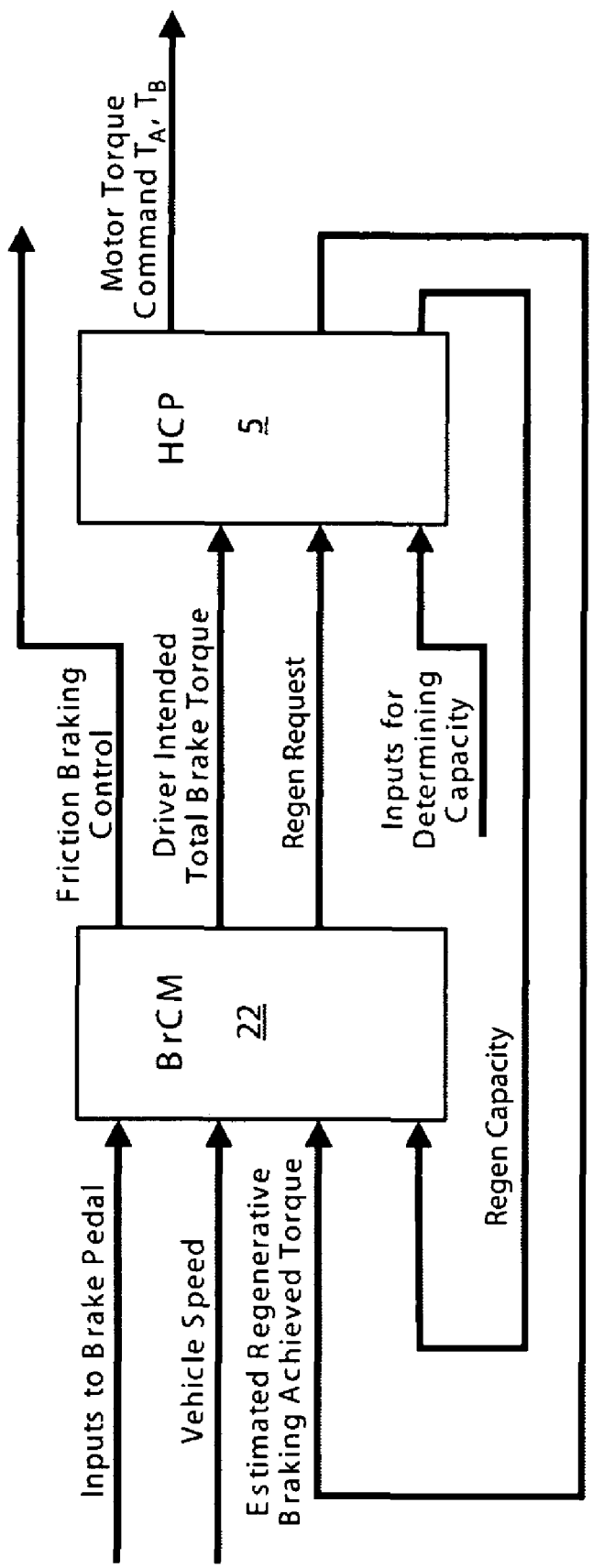

FIG. 3 shows a control system architecture for managing signal flow in the distributed control system for controlling regenerative braking and friction braking through one or more of the vehicle wheels 93, described with reference to the hybrid powertrain described hereinabove. The method described can be used by any vehicle having a powertrain system that includes a torque machine that can react torque transmitted from vehicle wheels to effect vehicle braking in addition to friction braking. Exemplary vehicles that can use the method for controlling regenerative braking and friction braking described herein include other types of hybrid vehicles including plug-in hybrid electric vehicles and electric vehicles that do not use other torque generating devices to provide propulsion in addition to an electric machine. Other hybrid powertrain systems on which the method for controlling regenerative braking and friction braking described herein can be used include, e.g., hydraulic-mechanical hybrid systems.

A driver intended total brake torque is determined by the BrCM 22 ('Driver Intended Total Brake Torque') utilizing operator inputs to the brake pedal 112 ('Inputs to Brake Pedal'). The driver intended total brake torque preferably comprises the immediate brake output torque. The BrCM 22 monitors the vehicle speed ('Vehicle Speed') based on the wheel speed determined using sensor 94. The BrCM 22 generates a regenerative braking request ('Regen Request') based upon a total braking torque request and a regenerative braking capacity ('Regen Capacity'). The BrCM 22 generates a friction brake control signal ('Friction Braking Control') to control the actuable friction brake in each of the wheels 93. The BrCM 22 acts as a master arbitrator for controlling the friction brakes and the transmission 10 to meet the driver intended total brake torque.

The HCP 5 determines the motor torque commands for the torque machines, e.g., the first and second electric machines 56 and 72 in one embodiment ('Motor Torque Command $T_A$, $T_B$') based upon the regenerative braking request determined in the BrCM 22. The HCP 5 determines the regenerative braking capacity ('Regen Capacity') based upon inputs for determining capacity ('Inputs for Determining Capacity'). The regenerative braking capacity comprises a maximum capacity of the transmission 10 to react torque transmitted from the driveline 90 and generate electric power that is storable in the ESD 74. The capacity of the transmission 10 to react tractive torque from the driveline 90 can be determined based upon system constraints. The system constraints in one embodiment include constraints related to operation of the first and second electric machines 56 and 72 as electric generators to react torque from the driveline 90, constraints comprising maximum and minimum clutch reactive torques of the selectively applied clutches C1 70, C2 62, C3 73, and C4 75, and constraints comprising maximum available power limits of the ESD 74, maximum and minimum motor torques of the first and second electric machines 56 and 72, battery power constraints of the ESD 74, preferably taking into account mechanical and electric power losses. Thus the inputs for determining the regenerative braking capacity include inputs related to operation of the powertrain system to transmit torque as described. Alternatively, the regenerative braking capacity comprises a capacity of a torque machine(s) (not shown) to react torque transmitted from a vehicle wheel(s) and generate electric power that is storable in the ESD 74 when the torque machine(s) is coupled to the vehicle wheel (s).

In operation, the HCP 5 executes a motor torque determination function to estimate the presently applied regenerative braking torque transmitted between the driveline 90 and the output member 64 of the transmission 10, and communicates the regenerative braking capacity and the presently applied regenerative braking torque ('Estimated Regenerative Braking Achieved Torque') to the BrCM 22. The motor torque determination function determines a preferred output torque from the powertrain and generates the motor torque commands ('Motor Torque Command $T_A$, $T_B$') for controlling the first and second electric machines 56 and 72 based upon the regenerative braking request. The motor torque determination function determines the preferred output torque based upon the operator braking request via the brake pedal 112, the maximum regenerative braking output torque, and the friction braking control signal output from the BrCM 22 to the wheels. If the system constraints are met by operating the first and second electric machines 56 and 72 at motor torques $T_A$ and $T_B$, the HCP 5 determines the motor torque commands ('Motor Torque Command $T_A$, $T_B$') based upon the preferred output torque. If system constraints are not met by operating the first and second electric machines 56 and 72 at motor torques $T_A$ and $T_B$, the HCP 5 sets the motor torque commands to control the motor torques of the first and second electric machines 56 and 72 based upon the aforementioned system constraints.

The HCP 5 uses closed loop control values to determine the regenerative braking capacity, which can cause the regenerative braking capacity to rapidly increase or decrease. Due to communications time delays between the HCP 5 and the BrCM 22, the regenerative braking request may overshoot or undershoot the regenerative braking capacity. Thus, rapid changes in the regenerative braking capacity can lead to system instability or reduced performance of the regenerative braking system.

The BrCM 22 executes a regenerative braking output torque determination function to generate a regenerative braking request based upon the total braking torque request and the regenerative braking capacity. When a time-rate change in the regenerative braking capacity exceeds a predetermined threshold, the regenerative braking request is determined by modifying the regenerative braking capacity using a first slope regulating function to substantially reduce the chance of capability mismatch, while allowing for increased regenerative braking and associated energy recovery. The first slope regulating function comprises a forward-fitting large curve fit operation to calculate the regenerative braking request based upon the regenerative braking capacity. As stated previously, the forward-fitting large curve fit operation is used to maximize regenerative braking output while minimizing the likelihood of overshoot or undershoot when there is a large time-rate change in the regenerative braking capacity. When the time-rate change in the regenerative braking capacity is within the threshold, the regenerative braking request is determined by modifying the regenerative braking capacity using a second slope regulating function to maximize regenerative braking and associated energy recovery. The second slope regulating function comprises a forward-fitting small curve fit operation to calculate the regenerative braking request based upon the regenerative braking capacity. The forward-fitting small curve fit operation maximizes energy output from the regenerative braking operation based upon a reduced likelihood of an overshoot or undershoot due to the low rate of change in the regenerative braking capacity. The large and small curve fitting functions are used by the BrCM 22 to modify the regenerative braking capacity at any given instant in time during ongoing regenerative braking operation to generate the regenerative braking request ('Regen Request').

The first and second slope regulating functions can be derived based upon an equation of a general form permitting a thrice or more differentiable function, e.g.:

$$P(v) = 1 - e^{-(\frac{v-\alpha}{\eta})^\beta}$$

wherein $\alpha$ is a location parameter;
$\beta$ is a shape parameter; and
$\eta$ is a scale parameter.

The preferred slope regulating function can be applied to determine torque, i.e., the regenerative braking request, in context of the regenerative braking capacity in a moving vehicle, to maximize energy output from the regenerative braking operation based upon a likelihood of an overshoot or undershoot due to a rate of change in the regenerative braking capacity. The preferred differentiable function takes into account and is differentiable in terms of distance, velocity and acceleration to determine and manage driveline jerk, i.e., a time-rate change in acceleration.

The first slope regulating function is described with reference to Eqs. 1-3, comprising applying a three-term Weibull function in the forward-fitting large curve fit operation to maximize the regenerative braking request based upon the regenerative braking capacity when there is a large time-rate change in the regenerative braking capacity. This operation provides a balance between reducing mismatches between the regenerative braking request and the regenerative braking capacity that lead to overshoot or undershoot, and maximizing the entire regenerative braking capacity. The second slope regulating function is described with reference to Eqs. 4-8, comprising applying a three-term Weibull function in the forward fitting small curve fit operation to maximize the regenerative braking request when there is a large time-rate change in the regenerative braking capacity. One having ordinary skill in the art can apply differentiable functions other than a Weibull function to accomplish the result.

A form of the Weibull function can be applied to derive the large curve, which can be represented by the term $y_{LARGE}$:

$$y_{LARGE} = (1 - 1e^{-T_1(x-ta1)^{T_2}}) * (scale_{y1} - scale_{y2}) + tx0 \quad [1]$$

In Eq. 1, the term $T_1$ can be derived based upon the scale parameter $\eta$ and the shape parameter $\beta$ and the location parameter $\alpha$.

$$T_1 = \frac{1}{\eta^\beta}$$

The term $T_2$ is the shape parameter, i.e., $T_2=\beta$.

The term ta1 is the location parameter $\alpha$. In one embodiment, ta1=tx1, below.

Thus, terms $T_1$ and $T_2$ are Weibull function terms that can be derived from Eq. 1 based upon the location, shape and scaling of the application, as follows:

$$T_1 = \frac{\ln(ty1) - \ln(ty2)}{(tx2 - tx1)^{T_2}} \quad [2]$$

and $$T_2 = \frac{\ln\left(\frac{\ln(ty1) - \ln(ty2)}{\ln(ty1) - \ln(ty3)}\right)}{\ln(tx2 - tx1) - \ln(tx3 - tx1)} \quad [3]$$

In Eqs. 1-3, $y_{LARGE}$ is torque output, i.e., the regenerative braking request, and each of the 'txn' terms (n=1, 2, 3) is a value of x for a desired value for y, the 'tyn' terms (n=1, 2, 3) defines a curve shape, in this embodiment a first S-curve that comprises the large curve. In the above equations, x is the input torque, i.e., the regenerative braking capacity;
tx0 defines a starting or target offset torque;
tx1 defines an endpoint for the large curve;
tx2 defines a midpoint for the large curve;
tx3 defines a starting point for the large curve;
ty1 defines a slope, i.e., a gain of the large curve;
ty2 is a ratio between 0 and 1 for the of the large curve;
ty3 is a resolution of the large curve;
$scale_{y1}$ defines a minimum percent blend; and
$scale_{y2}$ defines a maximum percent blend.

The term $scale_{y1}$ defines a minimum percent blend, and $scale_{y0}$ defines a maximum percent blend.

A form of the Weibull function can be similarly applied to derive the small curve, which can be represented by the term $Y_{SMALL}$:

$$y_{SMALL} = (1 - 1e^{-T_3(x-tb1)^{T_4}}) * (scale_{z1} - scale_{z2}) + scale_{z2} \quad [4]$$

In Eq. 4, the term $T_3$ can be derived based upon the scale parameter η and the shape parameter β and the location parameter α.

$$T_3 = \frac{1}{\eta^\beta}$$

The term $T_4$ is the shape parameter, i.e., $T_4=\beta$.

The term tb1 is the location parameter α, i.e., tb1 =α. In one embodiment, tb1=tu1, below.

Terms $T_3$ and $T_4$ are Weibull function terms that can be derived from Eq. 4 based upon the location, shape and scaling of the application, as follows.

$$T_3 = \frac{\ln(tv1) - \ln(tv2)}{(tu2 - tu1)^{T_4}} \quad [5]$$

and $$T_4 = \frac{\ln\left(\frac{\ln(tv1) - \ln(tv2)}{\ln(tv1) - \ln(tv3)}\right)}{\ln(tu2 - tu1) - \ln(tu3 - tu1)} \quad [6]$$

In Eqs. 4-6, $y_{SMALL}$ is torque output, i.e., the regenerative braking request, and each of the 'tun' terms (n=1, 2, 3) is a value of u for a desired value for y, and the 'tvn' terms (n=1, 2, 3) defines a curve shape, in this embodiment a second S-curve that comprises the small curve. The terms tu2 and tv2 are defined as follows:

$$tu2 = tu2_{factor} * tu1 + (1 - tu2_{factor}) * tu3 \quad [7]$$

$$tv2 = tv2_{factor} * tv1 + (1 - tv2_{factor}) * tv3 \quad [8]$$

wherein u is the input torque, i.e., the regenerative braking capacity, v is the regenerative braking request, tu1 defines the endpoint for the small curve, tu2 defines a first inflection point for the small curve, tu3 defines a starting point for the small curve, tv1 defines a slope, i.e., a gain of the small curve, tv2 defines a second inflection point for the small curve, and tv3 defines the resolution of small curve.

The term $scale_{z1}$ defines a minimum percent blend, i.e., the point where the small curve begins, and the term $scale_{z2}$ defines maximum percent of torque blend of the small curve.

Although in an exemplary embodiment the calculations can be based upon the regenerative braking capacity, in other embodiments the calculations can be based upon terms correlating to vehicle deceleration such as output speed or output power and thus, the regenerative braking request can be based thereon.

For both the forward-fitting large curve fit operation and the forward-fitting small curve fit operation, executing the equations results in a curved portion whereat the regenerative braking request increases (or decreases) exponentially with increasing (decreasing) regenerative braking capacity, and a second curve portion in which the regenerative braking request increases (decreases) at a substantially constant rate with increasing (decreasing) regenerative braking capacity near the inflection point. There is a third curve portion in which the regenerative braking request logarithmically increases (decreases) with increasing (decreasing) regenerative braking capacity.

Figure 4A:
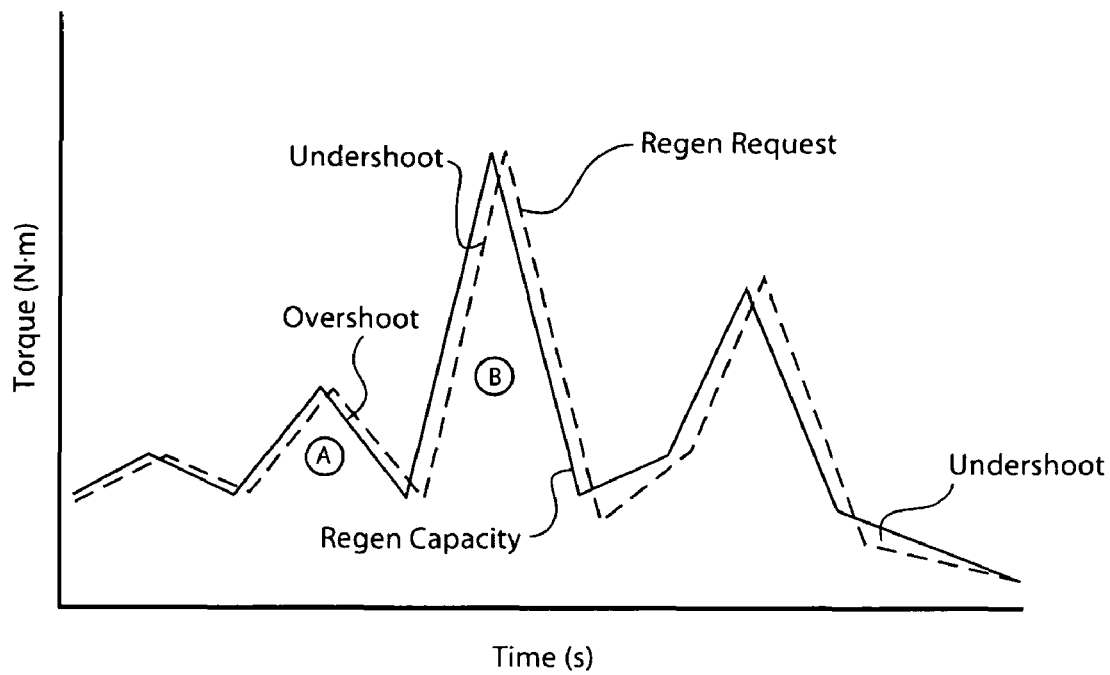
FIGS. 4A and 4B are graphical representations of system operation in accordance with the present disclosure.

FIG. 4A graphically depicts exemplary operation of a regenerative braking system, including a regenerative braking capacity and a regenerative braking request. The regenerative braking capacity as produced by the HCP 5 can be described as a sawtooth waveform. As depicted, the regenerative braking request follows the sawtooth waveform, lagging and leading the torque changes in the regenerative braking capacity in a sawtooth fashion. Areas labeled as 'overshoot' indicate where the regenerative braking request exceeds the regenerative braking capacity, with actual braking (not shown) less than the total brake torque ('Driver Intended Total Brake Torque'). During an 'overshoot' condition, more regenerative energy is requested than is available. Areas labeled as 'undershoot' indicate where the regenerative braking request is less than the regenerative braking capacity, with actual braking (not shown) meeting the total brake torque ('Driver Intended Total Brake Torque'). During an 'undershoot' condition, less regenerative energy is captured than is available.

Figure 4B:
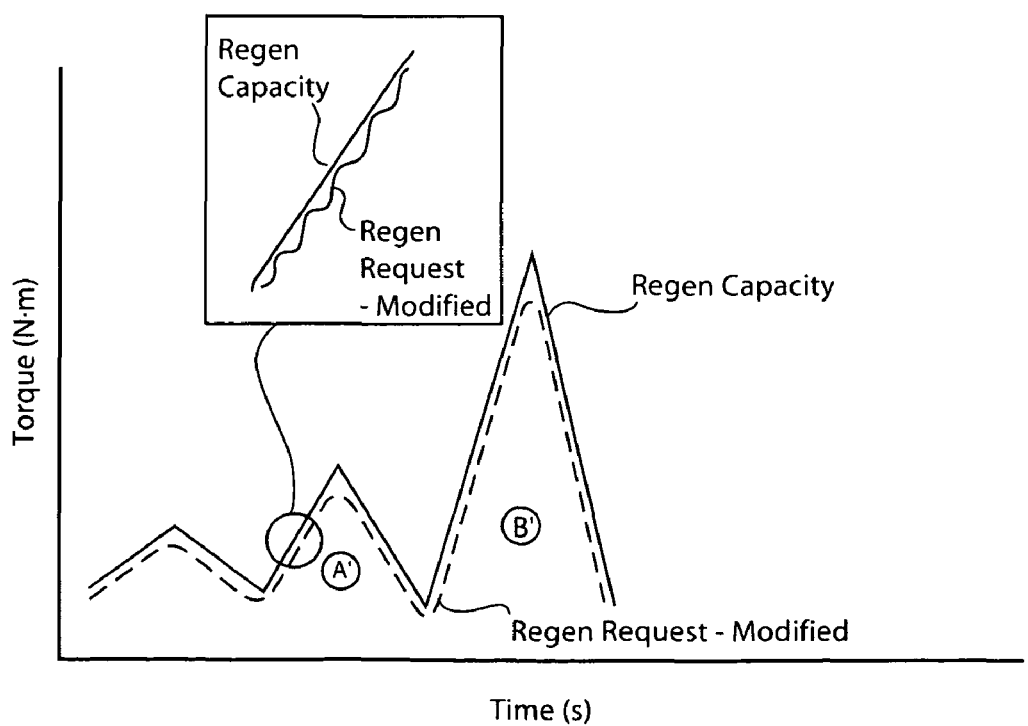

FIG. 4B graphically depicts operation of the system described with reference to FIG. 3 using the first and second slope regulating functions described with reference to Eqs. 1-8, above, to modify the regenerative braking capacity, as applied in an exemplary hybrid powertrain system described in FIGS. 1 and 2 to illustrate the operation. FIG. 4B shows a regenerative braking capacity and a regenerative braking request that has been modified ('Regen Request-Modified') based upon the slope regulating function. A first region ('A') utilizes the forward-fitting small curve fit operation when the time-rate change in the regenerative braking capacity is less than the predetermined threshold. A second region ('B') uses the forward-fitting large curve fit operation when the time-rate change in the regenerative braking capacity exceeds the threshold. The regenerative braking request ('Regen Request-Modified') does not exceed the regenerative capacity, and undershoot is minimized. The BrCM 22 continually executes the maximum regenerative braking output torque determination function to determine the regenerative braking request to maximize regenerative braking and associated energy recovery, without overshooting with minimal undershooting.

By properly coordinating the regenerative braking request with the regenerative braking capacity, the performance of the braking system can be improved, as indicated by a reduction in the noise and vibration of the system as well as higher energy efficiency and reduced disturbances to the energy storage system.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling braking in a vehicle including a friction braking system and a powertrain system including a torque machine operative to react tractive torque input from a wheel of the vehicle, a microprocessor performs the following steps:

monitoring operation of the powertrain system;
determining a driver intended total brake torque;
determining a regenerative braking capacity based upon the operation of the powertrain system;
determining a regenerative braking request based upon a time-rate change in the regenerative braking capacity comprising determining the regenerative braking request based upon the regenerative braking capacity modified using a first slope regulating function when the time-rate change in the regenerative braking capacity exceeds a threshold and determining the regenerative braking request based upon the regenerative braking capacity modified using a second slope regulating function when the time-rate change in the regenerative braking capacity is within the threshold; and
determining a motor torque command for the torque machine based upon the regenerative braking request;
wherein determining the regenerative braking request based upon the regenerative braking capacity modified using the first slope regulating function when the time-rate change in the regenerative braking capacity exceeds the threshold comprises applying a three-term Weibull function in a forward-fitting large curve fit operation to maximize the regenerative braking request based upon the regenerative braking capacity; and
wherein determining the regenerative braking request based upon the regenerative braking capacity modified using the second slope regulating function when the time-rate change in the regenerative braking capacity is within the threshold comprises applying a three-term Weibull function in a forward fitting small curve fit operation to maximize the regenerative braking request based upon the regenerative braking capacity.

2. The method of claim 1, further comprising determining a braking torque command to the friction brakes based upon the driver intended total brake torque and the regenerative braking request.

3. The method of claim 1, wherein determining the regenerative braking request based upon the regenerative braking capacity modified using the first slope regulating function further comprises determining the regenerative braking request based upon the regenerative braking capacity modified using a slope regulating function determined based upon the time-rate change in the regenerative braking capacity.

4. The method of claim 3, wherein the slope regulating function includes a first curve portion whereat the regenerative braking request increases exponentially with increasing regenerative braking capacity, a second curve portion in which the regenerative braking request increases at a substantially constant rate with increasing regenerative braking capacity near an inflection point, and a third curve portion in which the regenerative braking request logarithmically increases with increasing regenerative braking capacity.

5. The method of claim 3, wherein the slope regulating function includes a first curve portion whereat the regenerative braking request decreases exponentially with decreasing regenerative braking capacity, a second curve portion in which the regenerative braking request decreases at a substantially constant rate with decreasing regenerative braking capacity near an inflection point, and a third curve portion in which the regenerative braking request logarithmically decreases with decreasing regenerative braking capacity.

6. Method for controlling braking in a vehicle including a friction braking system and a powertrain system including a plurality of torque machines operative to react tractive torque input from a driveline, a microprocessor performs the following steps:

monitoring operation of the powertrain system;
determining a driver intended total brake torque;
determining a regenerative braking capacity based upon the operation of the powertrain system;
determining a regenerative braking request based upon the regenerative braking capacity modified using a slope regulating function comprising determining the regenerative braking request based upon the regenerative braking capacity modified using a first slope regulating function when the time-rate change in the regenerative braking capacity exceeds a threshold and determining the regenerative braking request based upon the regenerative braking capacity modified using a second slope regulating function when the time-rate change in the regenerative braking capacity is less than the threshold;
determining motor torque commands for the first and second torque machines based upon the regenerative braking request, and
determining a braking torque command to the friction brakes based upon the driver intended total brake torque and the regenerative braking request.

7. The method of claim 6, further comprising determining the regenerative braking request based upon the regenerative braking capacity modified using the slope regulating function determined based upon the time-rate change in the regenerative braking capacity.

8. Method for controlling braking in a vehicle including a friction braking system and a powertrain system including a torque machine operative to react tractive torque input from a driveline, a microprocessor performs the following steps:

determining a regenerative braking capacity based upon the operation of the powertrain system;
determining a regenerative braking request based upon the regenerative braking capacity modified using a slope regulating function, wherein the slope regulating function comprises a first slope regulating function when the time-rate change in the regenerative braking capacity exceeds a threshold and the slope regulating function comprises a second slope regulating function when the time-rate change in the regenerative braking capacity is less than the threshold;
determining a motor torque command for the torque machine based upon the regenerative braking request, and
determining a braking torque command to the friction brakes based upon the driver intended total brake torque and the regenerative braking request; wherein determining the regenerative braking request based upon the regenerative braking capacity modified using the first slope regulating function comprises applying a three-term Weibull function in a forward-fitting large curve fit operation to maximize the regenerative braking request based upon the regenerative braking capacity; and
wherein determining the regenerative braking request based upon the regenerative braking capacity modified using the second slope regulating function comprises applying a three-term Weibull function in a forward-fitting small curve fit operation to maximize the regenerative braking request based upon the regenerative braking capacity.

* * * * *